C. D. HOLLEY.
FURNACE.
APPLICATION FILED MAR. 3, 1911. RENEWED APR. 9, 1914.
1,116,703.
Patented Nov. 10, 1914.
2 SHEETS—SHEET 1.
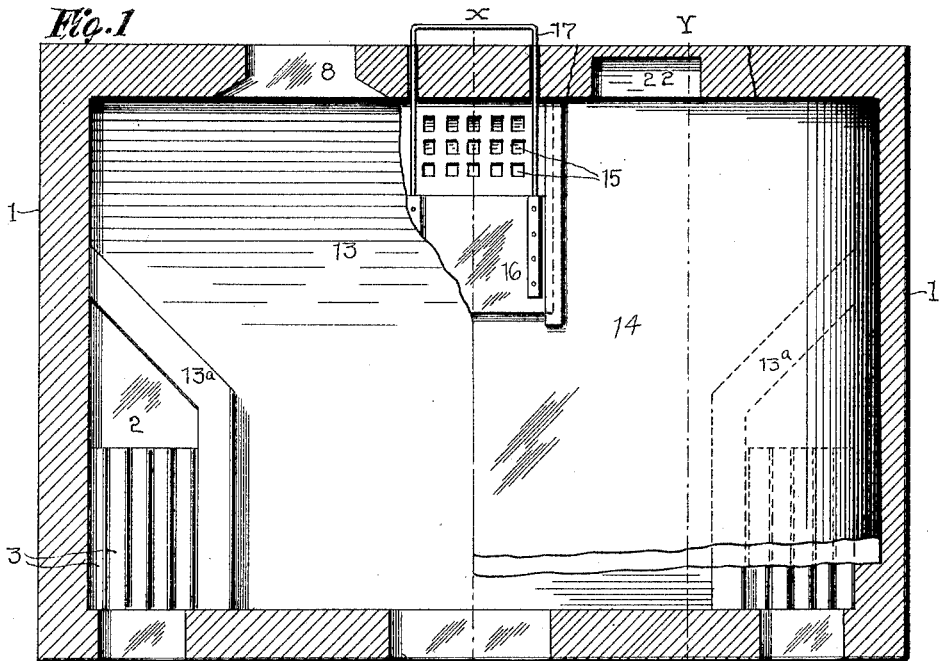
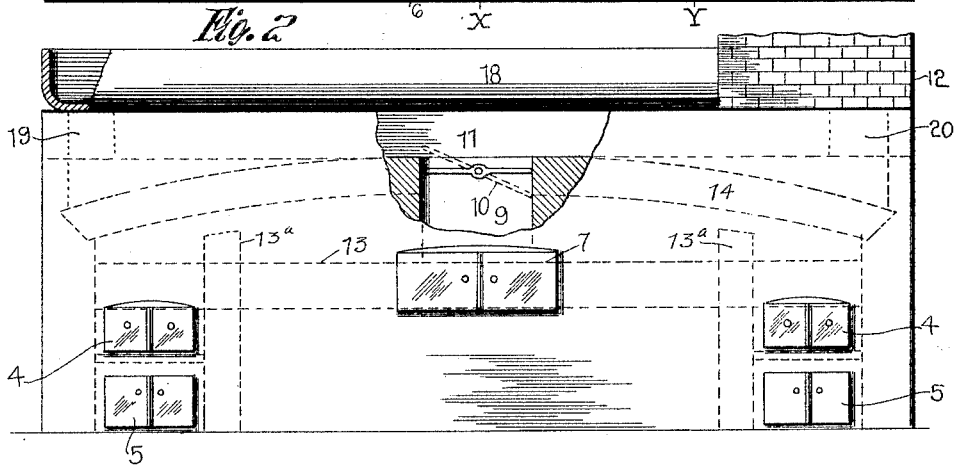
WITNESSES
Robert M. Sutphen.
R. F. Steward.
INVENTOR
CLIFFORD D. HOLLEY
W. P. McElroy
Attorney

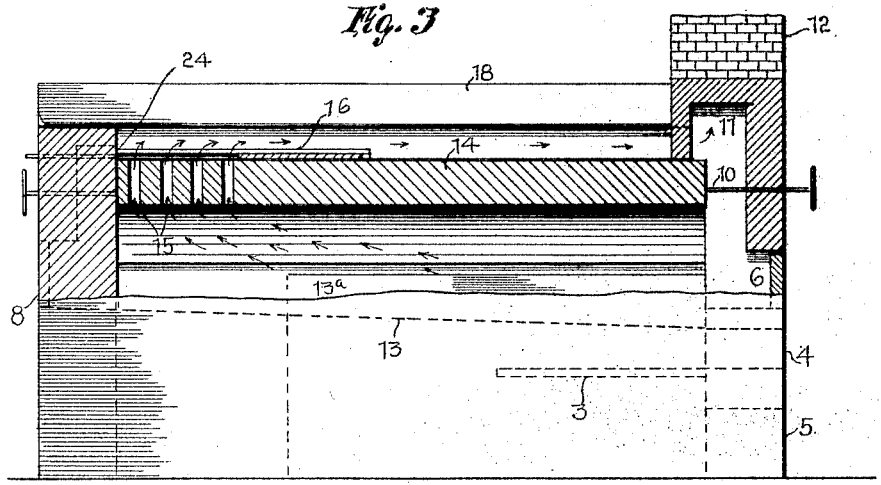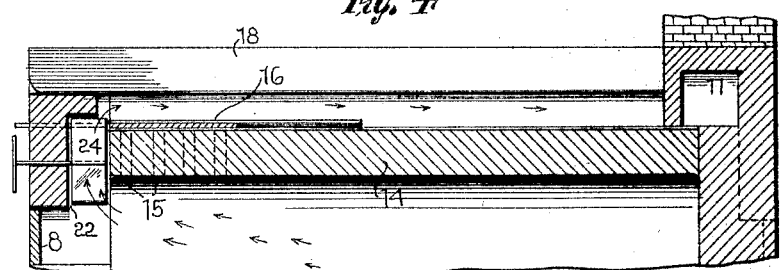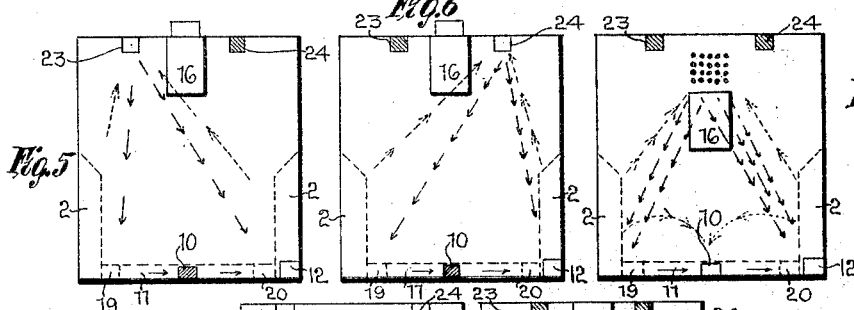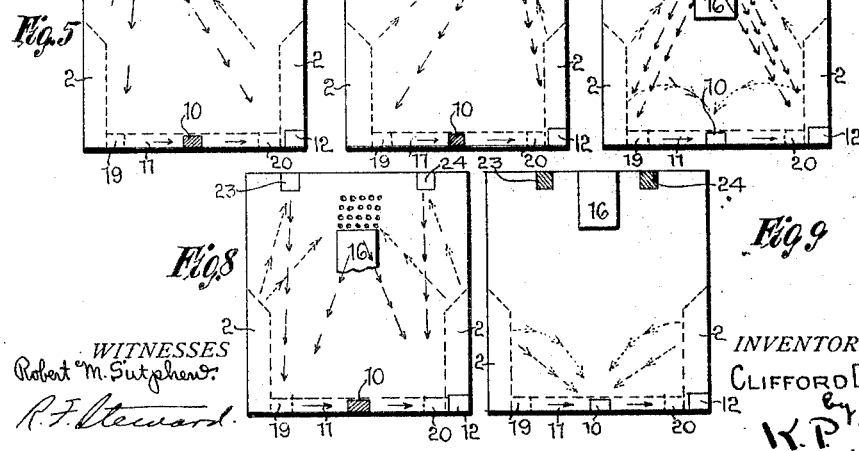

UNITED STATES PATENT OFFICE.

CLIFFORD D. HOLLEY, OF DETROIT, MICHIGAN, ASSIGNOR TO ACME WHITE LEAD AND COLOR WORKS, OF DETROIT, MICHIGAN, A CORPORATION OF MICHIGAN.

FURNACE.

1,116,703.   Specification of Letters Patent.   Patented Nov. 10, 1914.

Application filed March 3, 1911, Serial No. 612,030. Renewed April 9, 1914. Serial No. 830,800.

*To all whom it may concern:*

Be it known that I, CLIFFORD D. HOLLEY, a citizen of the United States, residing at Detroit, in the county of Wayne and State of Michigan, have invented certain new and useful Improvements in Furnaces, of which the following is a specification.

This invention relates to furnaces; and it comprises a furnace for producing pigments and for like purposes, having a reverberatory furnace hearth chamber, a plurality of spaced grates or other firing means, and a plurality of distributed gated or dampered waste gas ports and flues forming controlling means for localizing the heat and oxidation at any desired point on said hearth by controlling the efflux of waste gases through such ports and flues; all as more fully hereinafter set forth and as claimed.

In the manufacture of pigments and for many other purposes involving delicate oxidations it is desirable to have a flame heated reverberatory furnace provided with means for accurately controlling from time to time the thermal and other conditions at any given point on the hearth while at the same time, for practical reasons, it is desired to have such a furnace of large size. For example in the manufacture of lead pigments accurate control of conditions at all times and at every point in the furnace is of the utmost importance. Red lead is usually made by preliminarily drossing lead to make the form of lead protoxid (PbO) known as massicot; an unfused, open-textured form of oxid which is probably of little molecular complexity as compared with the form of protoxid known as litharge. This massicot is then further oxidized to produce red lead. In making massicot it is necessary that the temperature shall at no time rise high enough to convert the massicot into litharge; which means a very close control of temperature. A mass of lead must be maintained on the hearth and heated high enough to oxidize it, free access of air being given to all parts and access of flame or reducing gases being completely precluded, while at the same time at no point must the temperature rise high enough to fuse or sinter the massicot or convert it into litharge. Litharge, unlike massicot, cannot practically be converted into red lead or minium ($Pb_3O_4$) by further oxidation. There must be also free access of working tools to all points on the hearth to permit rabbling and working. In the conversion of massicot to red lead by further oxidation there must, similarly, be an exact control of temperatures and of conditions. Any undue rise or lowering of temperatures at once stops the formation of red lead—in the former case permanently; while any access of reducing gases ruins the color. So great are the difficulties in red lead making in an ordinary open furnace that massicot is usually transferred to a muffle for the further conversion into red lead or minium. In making red lead from metallic lead, therefore, the heating and oxidation must be very carefully controlled, first in the drossing operation and secondly in the subsequent conversion to red lead. Where the red lead is made from an oxid or hydrate prepared in the wet way, the same difficulties attach to the red lead making step proper.

In the present invention I have devised a type of furnace permitting the desired accurate control of conditions at localized points on the hearth, this furnace being particularly adapted for making lead pigments for this reason although it may of course be used for any purpose for which it is suitable. It may be employed for making massicot, either from metallic lead or from lead hydrates or from such mixtures of lead and lead hydrates as are made in various wet oxidation methods, and it may also be used for making red lead from massicot. For this purpose I provide a reverberatory chamber with a plurality of firing means spaced apart, such as a pair of grates at opposite ends of the furnace chamber and I provide a plurality of gated or dampered waste-gas exit ports located at different points above the hearth so that the course of flame and fire gases over the hearth may be changed at will. The firing may be by any of the usual fuels, coal, coke, gas or oil. Regenerative and recuperative heating are less suitable because of the necessity of using comparatively low temperatures. In an advantageous embodiment of my invention, a flat wide hearth having a slight slope from back to front to permit convenient transfer of material is provided in a reverberatory chamber having a plurality of firing means near the front on each side and spaced away from each other. A pair of ordinary grates do very well, though of course oil or gas burners may be substituted. At the back are a pair of charging doors, one near each side. At the front is a discharging door. A dampered flue leads upward from the chamber near the middle of the front wall and it may advantageously be directly above the discharging door. At the rear are a pair of spaced dampered flues also leading upward from the chamber and advantageously located above the charging doors. Between these latter flues the arch above the chamber may be perforated to give another exit for waste gases, dampering means being provided for this exit. Above the hearth is a low flat reverberatory arch having a waste gas chamber above it with which the several flues and the perforations in the arch all communicate, and this chamber in turn communicates with a flue leading to a stack or other waste gas removing means. The chamber may be, and advantageously is, formed by a pan supported by the furnace walls and spaced somewhat away from the arch. This enables waste heat from the hearth chamber to be used in various operations connected with the wet methods of oxidizing lead. In the oxidation, flame gases must be spaced away from the material, oxidation being by underlying air currents. With the described structure the flame gases rise into the low arch out of contact with the material while still in heat radiating proximity thereto. And the described upwardly leading system of waste gas outlets does not tend to force flame gases toward the hearth. With a pair of firing means and the several controllable waste gas exits stated, it is obvious that oxidizing and heating conditions can be accurately controlled at all points on the hearth. The location of upwardly leading flues immediately above the charging and discharging doors enables convenient operation of the furnace without disturbance of material on the hearth by drafts of cold air. Entering air drafts tend to go upward toward the flues while hot gases coming across the hearth also curve upward into the flues without disturbing the workman standing at the open door. When a door is open ordinarily the flue above it will have its damper so adjusted as to permit upward draft.

In the accompanying illustration I have shown, more or less diagrammatically, certain embodiments of the described invention.

In this showing, Figure 1 is a plan view partly in section and partly broken away of a furnace under the present invention; Fig. 2 is a front view partly in elevation and partly broken away; Fig. 3 is a longitudinal vertical section, partly in elevation, taken along line $x$—$x$ of Fig. 1; Fig. 4 is a detailed section similar to Fig. 3 but taken along the line $y$—$y$ of Fig. 1; Figs. 5, 6, 7, 8 and 9 are diagrammatic illustrations of the course of furnace gases with different settings of dampers.

In Fig. 1 element 1 is a chamber provided with a pair of firing devices 2 shown as grated at 3. 4 (Fig. 2) is a fire door. 5 is an ash pit door. The front of the furnace is provided with a working and discharge opening 6 having doors 7 and the rear of the furnace is provided with a pair of charging openings 8. Above the discharge door is a flue 9 having a movable damper 10 and leading into chimney flue 11, which extends across the entire width of the furnace and leads to chimney 12. The furnace hearth or floor 13 of the furnace chamber is separated from the grated firing devices by bridge walls 13$^a$. The hearth may slope gently from the charging to the discharging side of the furnace. Arch 14 forms the roof of the furnace chamber and is provided with port holes 15, which may be located near the charging side or back of the furnace and between the charging openings. These port holes may be closed by movable damper 16 controlled from the outside by any suitable means 17. Supported by the furnace walls and spaced away from the arch to form a waste gas chamber is roofing member 18 which forms a tight closure for the upper part of the furnace above the arch and which may be a flat drying bed or a drying pan. The waste gas chamber between the arch and the roof communicates with the chimney flue at 19 and 20. Above the charging doors and connecting the upper and lower chambers are flues 21 and 22 having movable dampers 23 and 24.

The operation of my new furnace will be readily understood from the foregoing description and from the diagrams shown in Figs. 5 to 9. In these diagrams the course of the flame gases in the lower or hearth chamber is indicated by dotted direction arrows, and in the upper chamber by solid direction arrows. Open dampers are indicated by open squares, while closed dampers are shown as cross-hatched squares. By suitable combinations of open and closed dampers, concentration of heat on any portion of the hearth may be obtained according to the conditions required at any stage of the furnacing process. Assuming that the lead to be furnaced has just been introduced on the charging side and that it is desired to concentrate the heat on that part of the hearth, damper 10 is closed and dampers 16, 23 and 24 are opened. Under these conditions, the flame gases follow the course indicated in Fig. 8, passing directly to the back part or charging side of the hearth and then up through flues 21 and 22 and port holes 15 to the upper chamber, and thence forward over the arch through ports 19 and 20 into flue 11, from which they discharge into chimney 12.

Figs. 5 and 6 show arrangements of dampers to concentrate the heat near one or the other of the charging doors. Fig. 7 illustrates a damper setting to give strongest seating near the middle and front of the hearth, while the arrangement of Fig. 9 results in concentration of heat just in front of the working or discharge door.

Obviously the number and location of flues and other details of construction may be varied to meet varied conditions, the furnace above described being merely one of the many embodiments of which the invention is capable.

What I claim is:—

1. In a pigment furnace, a fire chamber having a hearth and a roof arch, a plurality of flame producing means opening into said chamber at different points and upwardly leading means for removing waste gases from said chamber in controllable communication therewith through ports at a plurality of spaced points, the relative location of the firing means and of the ports being such as to permit a controllable flame gas circulation under the roof arch and over any point on said hearth.

2. In a pigment furnace, a fire chamber having a hearth, a plurality of spaced flame producing means communicating directly with said chamber near its front, upwardly leading means for removing waste gases from said chamber in communication therewith through suitable ports at a plurality of spaced points, a door at the front of said chamber and a door at the rear, there being one of such ports above each such door.

3. In a pigment furnace, a fire chamber having a hearth, a plurality of flame producing means communicating with said chamber near its front, means for removing waste gases from said chamber in communication therewith through suitable ports at a plurality of spaced points, a door at the front of said chamber and a spaced pair of doors at the rear, there being one of such ports above each such door.

4. In a pigment furnace, a fire chamber having a hearth, a plurality of flame producing means communicating with said chamber near its front, means for removing waste gases from said chamber in communication therewith through suitable ports at a plurality of spaced points, a door at the front of said chamber and a spaced pair of doors at the rear, there being one of such ports above each such door and another port in the roof of the chamber between such pairs of doors.

5. In a pigment furnace, a fire chamber having a hearth and a low arched roof, a waste gas chamber above such roof communicating with a waste gas outlet, a plurality of spaced flame producing means directly communicating with said fire chamber at different points and upwardly leading dampered means establishing communication between said waste gas chamber and said fire chamber, the relative location of said flame producing means and said dampered means being such as to permit a controllable flame gas circulation over any point on said hearth.

6. In a pigment furnace, a fire chamber having a hearth and a low arched roof, a panlike element spaced above such roof to form a waste gas chamber therebetween, such waste gas chamber being in communication with a waste gas outlet, a plurality of flame producing means spaced apart and directly communicating with said fire chamber at different points and upwardly leading dampered means establishing communication between said waste gas chamber and said fire chamber, the relative location of said flame producing means and said dampered means being such as to permit a controllable flame gas circulation over any point on said hearth.

7. A furnace comprising a working hearth, firing devices spaced apart from each other and adapted to supply flame gases directly to a chamber above the hearth, a reverberatory arch suitably supported above said hearth to form said chamber, a roof above said arch to form a waste gas chamber, a main flue for conducting waste gas away from said waste gas chamber, flues at the opposite sides of said hearth connecting the hearth chamber with said waste gas chamber, and means in each flue for independently opening and closing the same to control and direct the circulation of gases over said hearth.

8. A furnace comprising a working hearth, a plurality of firing grates spaced apart and located near the front of said hearth and adapted to supply hot gases thereabove, a working door at the front of said hearth, a charging door at the rear of said hearth, a reverberatory arch above said hearth, a waste gas chamber above said arch, a flue adjacent to said working door and a flue adjacent to said charging door, both said flues affording communication between said hearth and said waste gas chamber and having adjustable damper means, and a discharge flue near the front of said waste gas chamber.

9. A furnace comprising a hearth chamber having a hearth sloping from back to front, a discharge door at the front of said hearth, grated firing means on each side of said discharge door, charging doors at the back of said hearth, a reverberatory arch extending over said hearth and having portholes located in that portion of the arch which is over the back part of the hearth, a drying pan above and spaced away from said arch to provide a waste gas chamber and to form the furnace roof, a flue over each charging door and a flue over said discharge door, each said flue leading from said hearth chamber to said waste gas chamber, and means for independently controlling the passage of gases through each said flue and through said port holes.

In testimony whereof, I affix my signature in the presence of witnesses.

CLIFFORD D. HOLLEY.

Witnesses:
A. J. PEPIN,
H. WATKINS.

Copies of this patent may be obtained for five cents each, by addressing the "Commissioner of Patents, Washington, D. C."